July 11, 1944. S. P. MILLER 2,353,627
HEAT CONTROL SYSTEM
Filed May 20, 1942 8 Sheets-Sheet 1

Inventor:
Samuel P. Miller,
By Joshua R. H. Potts
his Attorney.

July 11, 1944. S. P. MILLER 2,353,627
HEAT CONTROL SYSTEM
Filed May 20, 1942 8 Sheets-Sheet 2

Inventor:
Samuel P. Miller,
By Joshua R. H. Potts
his Attorney.

July 11, 1944.   S. P. MILLER   2,353,627
HEAT CONTROL SYSTEM
Filed May 20, 1942   8 Sheets-Sheet 7

Inventor:
Samuel P. Miller
By: Joshua R. H. Potts
his Attorney.

July 11, 1944.  S. P. MILLER  2,353,627
HEAT CONTROL SYSTEM
Filed May 20, 1942  8 Sheets-Sheet 8

Inventor:
Samuel P. Miller
By Joshua R. H. Potts
his Attorney

Patented July 11, 1944

2,353,627

UNITED STATES PATENT OFFICE 2,353,627

HEAT CONTROL SYSTEM

Samuel P. Miller, Chicago, Ill.

Application May 20, 1942, Serial No. 443,706

23 Claims. (Cl. 237—9)

This invention relates to an automatic control system for heating or heat transfer apparatus, and more particularly to a control system or means automatically operative to maintain a desired uniform or constant temperature and pressure in the various steam consuming or heat transfer units, elements, cylinders, drums, rollers, radiators, or the like, of heating or heat transfer or drying apparatus or systems, or for maintaining a constant relation or stepped or tapered variance in temperatures and pressures between the related or various elements or units thereof, especially where a fixed or a variable progressive or stepped heat, temperature, or pressure which may be above or below atmospheric pressure, that is a minus or vacuum pressure in pounds per square inch or inches, may be maintained between a plurality of related, adjacent or remote units of the heating apparatus or heat consuming or transfer system, so that they may be maintained or kept in a certain progressively related order to keep up the pressures and temperatures higher than formerly through any section of rolls or heat consuming units or the entire set of rolls, or to taper the pressure and temperature of the steam in any section from end to end, that is from the beginning of the calender, discharge or dry end of the machine to the wet or feeding end of the machine or vice versa throughout the entire set or sets of dryers or rollers, it being also to be understood that exhaust steam can be used in any section or throughout the machine or that live steam or exhaust and live steam together may be used, as preferred, without departing from the spirit of the invention. By this means, the automatic control means is adapted for heating and drying systems, particularly paper or cloth drying apparatus such as used in paper making machines where a web or sheet of material, which for the purposes of the present invention may be either paper, cloth or the like, enters the machine in a wet or moist condition and is discharged in a dry or finished condition after passing around the various driven rollers of the machine.

An important object of the invention is to insure constant and practically complete discharge or emptying of the units or drums individually and collectively of all condensation, steam, condensate, moisture or water therefrom to insure free and unimpeded circulation of the steam or other heating medium and prevent the formation of banks, walls or pockets of non-condensable gases or water of condensation to interfere with the proper circulation of the steam or vapor in the system, as well as with the ability to accurately and minutely regulate and control with accurate and uniform degree the heat of the steam or choking of the lines and drains with water or gases which would interfere with proper circulation and transfer the heat, whereby to maintain the highest efficiency and uniformity with self or automatic regulated or control means for keeping the regulated units or drums at uniform pressures or temperatures or progressively different pressures or temperatures above or below atmospheric pressure, i. e., vacuum or vapor, so as to insure proper heating or drying with the best possible results depending on the weight and kind of web, paper or cloth being dried, and extremely economical maintenance costs.

Another object of the invention is to obviate the necessity of using a single large heating drum or roll usually twelve to fourteen feet in diameter which are generally used for drying thin paper and not usable for other purposes. Such machines are usually shut down except when drying thin paper when in production and it is practically impossible to empty a drum of such diameter of condensate by differences in temperatures between the feeding and discharge ends thereof, as the condensate or water must be lifted from six to eight feet and it is impossible to obtain sufficient siphoning or vacuum pressure or differential between the feeding and discharge sides to accomplish this. Since the vacuum increases with the degrees in pressure with my control system it is possible to maintain the temperatures and pressures as high or low as desired with an established differential and to use much smaller rolls, usually sixty inches or 5 feet in diameter to properly and efficiently dry either light webs of paper or cloth or heavier webs of such material as to produce high grade sheet products which will maintain their proper texture and without scorching, embrittling, disintegrating, or burning the same, or resulting in a material which is too hard, stiff, harsh or scratchy instead of being soft, fluffy or light texture where this is desired.

Another object of the invention is to provide a heat transfer system which is self-regulating and particularly to automatic control means for steam heating and drying systems; which is not only very simple, but efficient and reliable at all times and may be employed for drying paper or cloth of various grades and will be equally efficient with paper or textiles and which while shown in connection with a system or machine for drying paper and the like is clearly adapted for use in connection with any desired heating or drying system employing units or sections which may be arranged for simultaneous or independent control or regulation in any desired arrangement.

Another object of the invention is to provide a heat transfer system automatically controlled or regulated within itself without human intervention and in which the temperature and pressure or degree of vacuum throughout the entire system may be maintained at a substantially uniform and predetermined point constantly and at all times or at different temperatures and pressures at different points in the various sections or units according to the purposes of the system and the work to be performed and in which the pressure and temperature may be maintained accurately at any desired high or low point or at any intermediate point therebetween, either uniform and predetermined throughout the entire system or at different tapered or stepped pressures and temperatures at different points or in the various transfer units or sections of the system.

Another object of the invention is to provide a heat transfer system or automatic control or regulating means for steam heating and drying systems having one or more transfer units, which may be produced at a very small cost and one which may be employed with known heat transfer systems such as paper drying drums or rolls of paper drying apparatus of paper making machines or cloth drying machines, without occasioning expensive changes and in which the pressure in the auxiliary or secondary steam line, in the units or at other locations may be maintained at a very low point, even below atmospheric pressure, that is, at a minus or vacuum pressure, such as used on vapor systems, as well as at any other desired pressure above atmospheric, and yet provides sufficient heat for the transfer system or according to the use to which the system is put.

Another object of the invention is to provide a novel, simple and accurate heat transfer system and self-regulating or automatic control means therefor by which the temperature or temperatures at various points or in various parts or units of the system may be maintained constantly at any desired or required pressure and temperature or heat, or at any desired stepped, tapered or progressively different pressures and temperatures or differential, according to and depending upon the conditions and results to be obtained, and automatically or self-regulated, that is, without human or manual intervention.

While the present invention and system is adapted for high or low pressure heating and heat transfer systems such as used in paper drying, it is also adapted for ordinary heat transfer systems and gives better and more accurate regulation, control and maintenance of uniform and predetermined temperature throughout the system and this automatically. In such systems and in the heating art, regulating valves are very old and it is well known that they are employed in the form of reducing valves and interposed between a primary steam pressure line for live steam and secondary steam pressure line whereby the steam is conducted from a boiler or other source of steam at a considerably higher pressure than it is desired to introduce into the secondary steam pressure line, manifold or header. Such regulating or reducing valves are designed to effect such a reduction of pressure and maintain in the secondary line a substantially uniform and predetermined pressure regardless of the pressure in the primary line and this principle is employed in connection with the present invention so that one regulating or reducing valve may be employed to control a plurality of units or series of drying drums, rolls or cylinders so that the paper web or other sheet material being dried from its point of entry to its point of exit, is subject to gradually increasing temperatures at each unit, section or station and rapid and continuous circulation of steam is maintained through the series of drying units while maintaining a constant or substantially constant temperature at each unit and a constant differential temperature between adjacent or succeeding units. In such a system, the steam or other condensable vapor is continuously circulated through a series of drying units or rollers whereby the condensate and accumulated air may be quickly and effectively removed whereby a rapid and continuous circulation of the steam or condensable heating medium may be maintained. Thus, in such systems a plurality of the units or series of units are operated from a common inlet or steam supply or successive supplies or exhausts and each automatically controlled to maintain a constant differential between the different units, the steam within which is maintained at different temperatures or pressures in its passage to, in and from a series of rollers or units so that as the used steam from one unit passes to the next unit, it leaves a region of higher pressure and temperature and enters one of a desired or slightly lower pressure and temperature, and therefore, whatever condensate remains is partly or largely converted into steam at the desired temperature which may be augmented at stated intervals by the admission of live steam from the supply source under automatic control. This control, in addition to affecting the operation of a plurality of units and maintaining a uniform and constant differential between the same, may also be employed to independently control each of a plurality of units with a control or reducing valve for each unit, as best suited or set to certain conditions or heat transfer systems, such as the nature of the material being dried where applied to a paper drying machine. The present invention relates further to an improvement upon said system where the control includes a return line or lines connected from the far or farthest end of the header or headers, low end or side or outlet of the last transfer element or roll or directly from the near outlet, end or side, to the opposite side of the control or reducing valve and diaphragm chamber so that the regulation or effect due to slight changes in pressure and temperature upon being set for a certain differential, is even more sensitive and positive, and more accurate and quicker whether controlling a plurality of units or each individual unit independently or separately. Thus, in high or low pressure or vacuum heat transfer systems such as employed in heating or in drying machines, the live, exhaust or live and exhaust steam may be fed to each unit or the exhaust steam from one unit may be carried to the next unit after the condensate is removed therefrom, by employment of a flash tank in which the condensate and vapor are heated to generate and maintain the steam pressure in succeeding units by employing the latent heat in the steam for evaporating the water in the web or in heating the various succeeding transfer units.

In some heating or heat transfer systems, the steam is supplied to one unit and then, after doing its work by heat transfer such as in heating or drying apparatus, the steam is supplied to the next unit or section and so on through successive units until the last one is heated, while in other systems, each unit receives its supply of heat directly from the main or live steam supply or a secondary fed thereby and the present automatic or self-regulated control means is applicable to either system and operates not from one side only of the diaphragm or piston control chamber for the feeding or reducing valve, by means of a separate water pressure pipe or by direct connection to the main or secondary steam supply, manifold pipes or headers alone, but directly, indirectly, or remotely from the far or low pressure side of the system either at the units or far end of the header, headers or secondaries, or a drain or outlet thereof under low, suction or vacuum pressure which may be 10 or 12 inches of vacuum in a vacuum or low pressure system and correspondingly higher in a high pressure system. The gas equalizing or control lines for automatic regulation of the heating of the units forms a loop or continuous circuit which is connected at its opposite ends to opposite chambers of the control valve diaphragm or piston instead of to only one side and thereby becomes much more sensitive and extremely accurate in maintaining the steam pressure at a predetermined point for each unit individually or in series, or all units and constant according to the adjustment or differential for which they are set, thus securing uniform heating and results with different and better products. In the type of heat transfer systems known as vacuum or low pressure systems, exhaust steam from a power generating engine is employed to supply heating systems or other heat transfer systems. Under such systems, steam may be delivered from the boiler to the heat transfer system at as much as 10 or 12 inches of vacuum, if desired, and this vacuum may be maintained at a constant degree by the automatic opening and closing of the regulating or reducing valve interposed between the primary from the boiler and the main secondary steam line. While such a result is highly desirable and increases the efficiency of the power generating engine and heating system, it is not adaptable to high pressure heating or heat transfer systems such as also used for heating and drying purposes and particularly where the steam used or condensed in the system is at a very high percentage and the present invention renders the system adaptable for both uses. In other words, the present invention is equally applicable to low pressure or vacuum systems as well as to high pressure heating, drying or heat transfer systems, as before pointed out, and results in a much more sensitive and positive control or automatic regulation and maintenance of a uniform pressure and temperature in each of a series or plurality of transfer units of a system where simultaneously or independently controlled units are employed by positioning and connecting a reducing and control valve for a plurality of units or between each pair or one unit and its succeeding unit, and where low pressures and temperatures is desired or pressures and temperatures stepped or tapered in each succeeding unit, element or roll, which is especially adapted for drying soft or tissue papers, thin cloth or textiles, or in other combinations thereof such as between a plurality of units at the calender, dry or discharge end and a single unit or one or more units at the wet, entering or feed end. This is due to the low pressure regulating or control lines being connected from the remote outlet or header end to the steam supply control or regulating and reducing valve for supplying additional or live steam to the system, on opposite sides of the diaphragm or piston thereof, to actuate the valve at the opposite pressure chambers thereof instead of to one side only thereof, thus also allowing a suction or vacuum pump to be employed to quickly exhaust or withdraw water, air and insoluble or non-condensable gases from the entire system and rendering the same and the valve quickly responsive to slight pressure and temperature changes to supply live or fresh steam, live and exhaust steam or simply exhaust steam to the system at the feed or high pressure and temperature side to maintain the heating uniform throughout or at the various independent or individual units, series of units or drying rolls or cylinders, or each cylinder, constant according to the pressure and temperature for which they are set, either high, or low or vacuum pressure, and keeping the set differential, differentials or variances between adjacent or succeeding heating units or cylinders as stepped or tapered, constant at all times without any manual adjustment, effort or intervention. This reducing valve may be set to taper or step the pressure and temperature in the entire set of rolls or cylinders, say from 50 or 30 to 10 pounds or even to a minus or 10 or 12 inches vacuum pressure, or any other differential wanted, and the low pressure steam or gas control or equalizing lines will quickly equalize each individual roll and keep the rolls from air or gas binding, as well as stop the individual rolls from creating a vacuum or going to a lower pressure due to rapid condensation of the steam while, at the same time, only employing very small pipes such as one-half or one-quarter inch diameter or substantially so, which can be quickly and economically installed and connected to known systems without alteration or rebuilding.

Another object of the invention is to provide a novel arrangement and construction of siphon of a siphon system and means for obtaining a maximum difference in pressures between the inlet and outlet of each roll so that the outlet and return control line will be at much lower pressure to insure a rapid circulation of steam or vapor and to lift the water or condensate from the bottom of each roll, for completely discharging and draining the waste water of condensation and condensed steam from within the drying cylinders as used in drying machines through the trunnions on which the cylinders revolve or are driven, said condensate being condensed from the steam used in heating the transfer units or cylinders.

Other objects and advantages will appear and be brought out more fully in the following specification, reference being had to the accompanying drawings, in which:

Figs. 1 and 1A are a diagrammatic side elevation of a portion of a paper making machine, showing the drying rollers or cylinders equipped with my automatic control system;

Fig. 4A is a section taken on the line 4A—4A of Fig. 4;

Figs. 5 and 5A are a diagrammatic side elevation corresponding to Figs. 1 and 1A, of a modified form of the control system;

Figs. 6 and 6A are a diagrammatic side elevation corresponding to Figs. 1 and 1A of a slightly modified form of control system.

Figure 1:
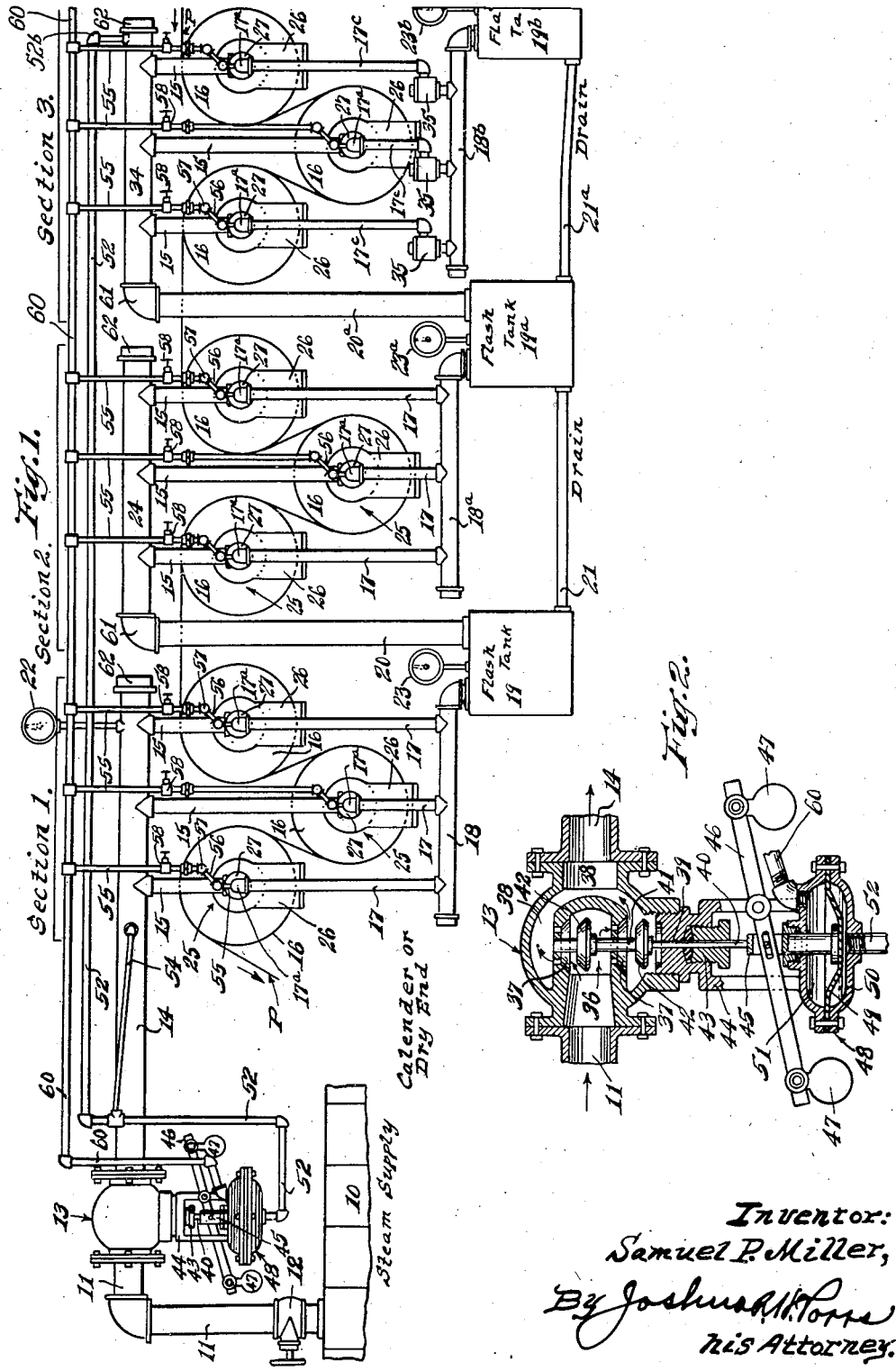

Referring to the drawings, in which I have illustrated four different embodiments of the invention, and particularly to the form shown in Figs. 1 to 4A, inclusive, 10 indicates a steam generator or supply shown as a conventional type of boiler which is employed to deliver steam at any suitable pressure to a primary steam line 11, or it may be an exhaust steam or vapor line, and 12 designates a boiler shut-off valve adjacent thereto. 13 is an automatically controlled feed regulating or reducing valve, the high pressure side of which is connected to the primary steam line 11 and controls the feeding, supply or discharge of steam at its low pressure side into a main secondary steam line 14 forming a manifold or header of a plurality of units or sections each comprising one or more heat consuming or transfer elements, units, radiators or rolls designated as Section 1, Section 2, Section 3 and Section 4, the first being at the discharge, calender or hot dry end and the last at the feeding, wet or entering end, also designated as the receiving end for the wet pulp sheet or web from the paper or cloth making or treating machine such as an ordinary Fourdrinier machine and the dry end being the discharge end for the finished product, the paper P passing around the various rolls or cylinders of the drying machine, part or apparatus and any desired number of rollers or cylinders being employed in each unit or section, as desired, or as is customary and common in the art. For convenience, three of such cylinders are shown in Sections 1, 2, and 3, and 8 cylinders are shown in Section 4 by way of illustration, but the number usually employed generally varies from 5 to 8 or more, or otherwise, as desired except where a large single roll or drum usually from 12' to 14' in diameter is used for light paper or the like and is eliminated by the present invention. The illustration of three cylinders in the first three sections or units is merely coincidental and for the purpose of illustration and simplicity and to condense the drawings or showing instead of extending the same as in Section 4, as any desired or necessary number may be employed. Extending from the main secondary supply line or header 14 are a plurality of branch steam or vapor supply lines or pipes 15, which branch or auxiliary lines may be of any suitable size, but are shown smaller. The branch pipes 15 lead into the trunnions of the various rollers or cylinders 16 of the different sections or units of which Section 1 is illustrative. This steam is supplied around outlets or drains 17 for used steam or water of condensation from which the water is discharged or drained into a return main or header pipe 18 located below, although I wish to have understood that I do not desire to be restricted to the employment of this specific arrangement with the supply lines at the top instead of at the bottom. The return discharge or drain pipe 18 extends into the top of a flash tank 19 into which the previously used steam along with the vapor and condensate which is subjected to the action of the steam first used and discharged or exhausted therefrom, to generate additional steam or cause the same to convert or vaporize the condensate, moisture or water therein to flash or pass into the steam outlet 20 leading from the top of the tank and to the next unit or section somewhat as exhaust steam. A drain 21 for water extends from the bottom of the flash tank 19 to carry off any waste water or condensate not vaporized or converted into steam. A gauge 22 is provided on the secondary line 14 at any suitable point such as at the far end to indicate the pressure of the steam therein and a gauge 23 for similar purposes may be provided upon the flash tank 19. Continuing from Section or Unit 1 to Section 2, it will be noted that the latter is of substantially the same construction and arrangement, including a manifold, header or secondary steam supply line 24 also extending horizontally and in this instance, from the top of the steam outlet 20 preferably in line with the supply line 14, instead of from the main supply 11 and the valve 13 as is the main secondary supply line 14. Otherwise, the construction of the subsequent Sections 2 and 3 is the same as Section 1 and the line 24 may be provided with a similar gauge while the flash tank 19a is provided with a gauge 23a. In this instance, the return main or header drain pipe is designated at 18a and the flash tank 19a has a steam outlet 20a also extending upwardly, and a drain pipe 21a, in addition to the gauge 23a.

Figure 4:
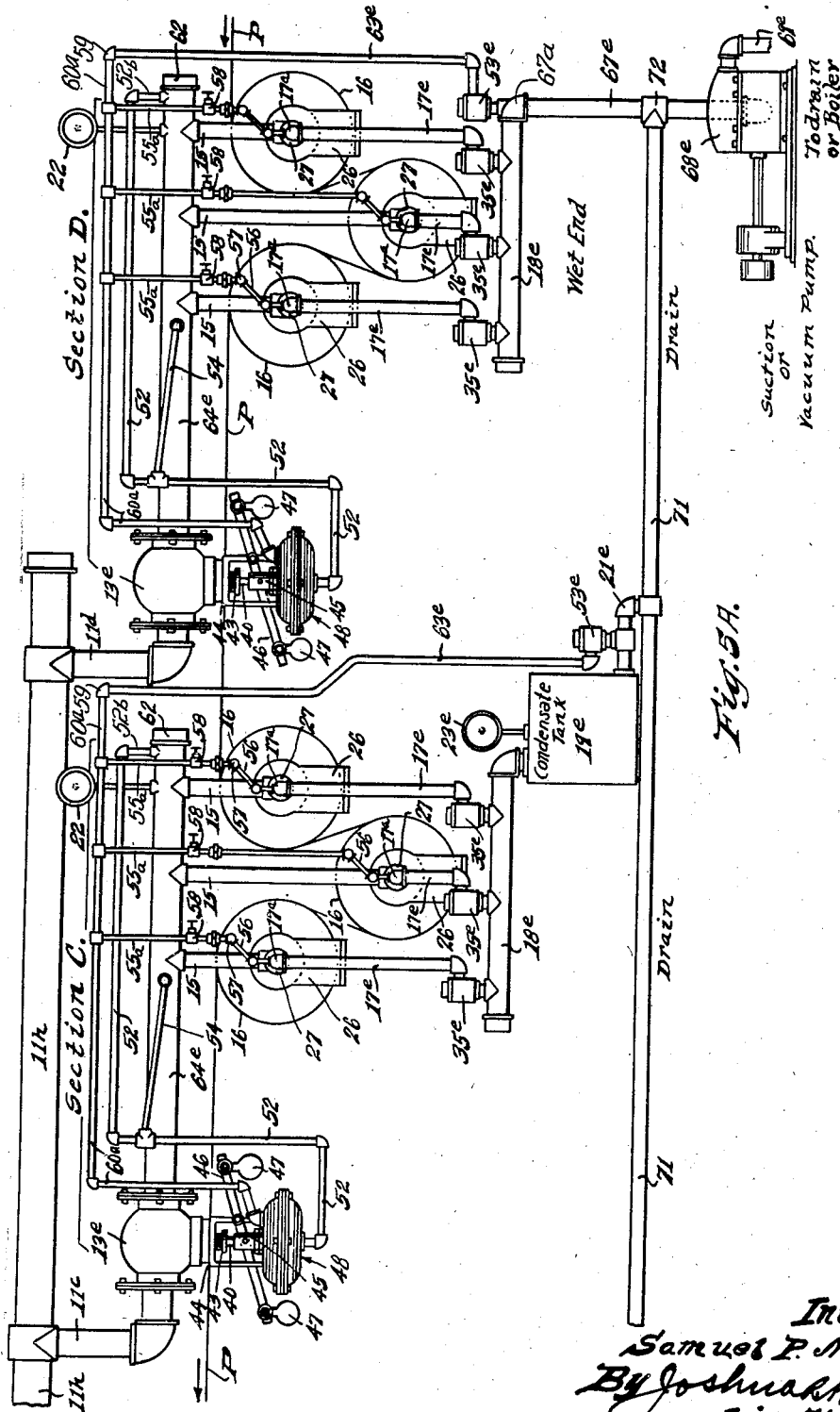
Fig. 4 is a section taken on the plane of the line 4—4 of Fig. 3, and showing also the lower portion of the roller or cylinder.

Each of the cylinders has a trunnion or roller bearing 25 on which the ends of the cylinders rotate and have support, the cylinders being driven to revolve at any suitable speed and in any desired way as is common in the art. The bearings are designated at 26 and are in the form of anti-friction or roller bearings if desired, which are carried by a stationary frame which may form the frame or sides of the drying machine or individual bearings therein in which are pipe fittings 27 or suitable nipples connected or threaded as shown at 28 and having passages 29 for the entrance of the steam. Suitable connections are made with the outlets or drains 17 of a siphon system which may include a tube or bushing 30 carried by, and attached to, or forming a part of the bearing 26 which are shown tubular and extending from the inner end thereof axially of the trunnion in alignment with an outer tube 31 forming a part of the fitting 27 and receiving the drain pipe 17 through a medium of elbows 17a and nipples 17b as shown more particularly in Fig. 4 of the drawings. A siphon pipe 32 is threaded at 32a in the tube 30 separate from the nipple 17b and this siphon pipe has an inclined outer portion 32b and is then bent at an obtuse angle toward its inner portion 32c which is inclined or slightly divergent from the cylindrical wall of the cylinder so as to incline at a slight angle with an enlarged inlet end 33 of convex curvature corresponding to the curvature of and spaced from said cylindrical wall as seen in Fig. 4A in the shape of a funnel or flared end permitting free outlet of the condensate. All of the cylinders are so equipped to provide a siphon system of drains for the cylinders.

The steam outlet 20a leads into a branch manifold or auxiliary steam line 34 constituting the manifold or header of Section 3, the same as the steam outlet 20 leads into the auxiliary steam line 24 of Section 2 to convey the exhaust and flash steam from Section 1. However, in Section 3, the drain pipes are denoted 17c corresponding to the drain pipes 17 of Sections 1 and 2 in which automatic steam traps 35 are interposed in the form of trap valves which allow the water to be discharged without apparent loss or passage of steam into the return drain pipe or header 18b which empties into the flash tank 19b provided with a similar steam outlet 20b corresponding to the risers or outlets 20 and 20a. The flash tank for condensate is provided with a drain 21b which may lead to a discharge or return to the boiler. A similar gauge 23b may be provided upon the flash tank 19b.

Figure 2:
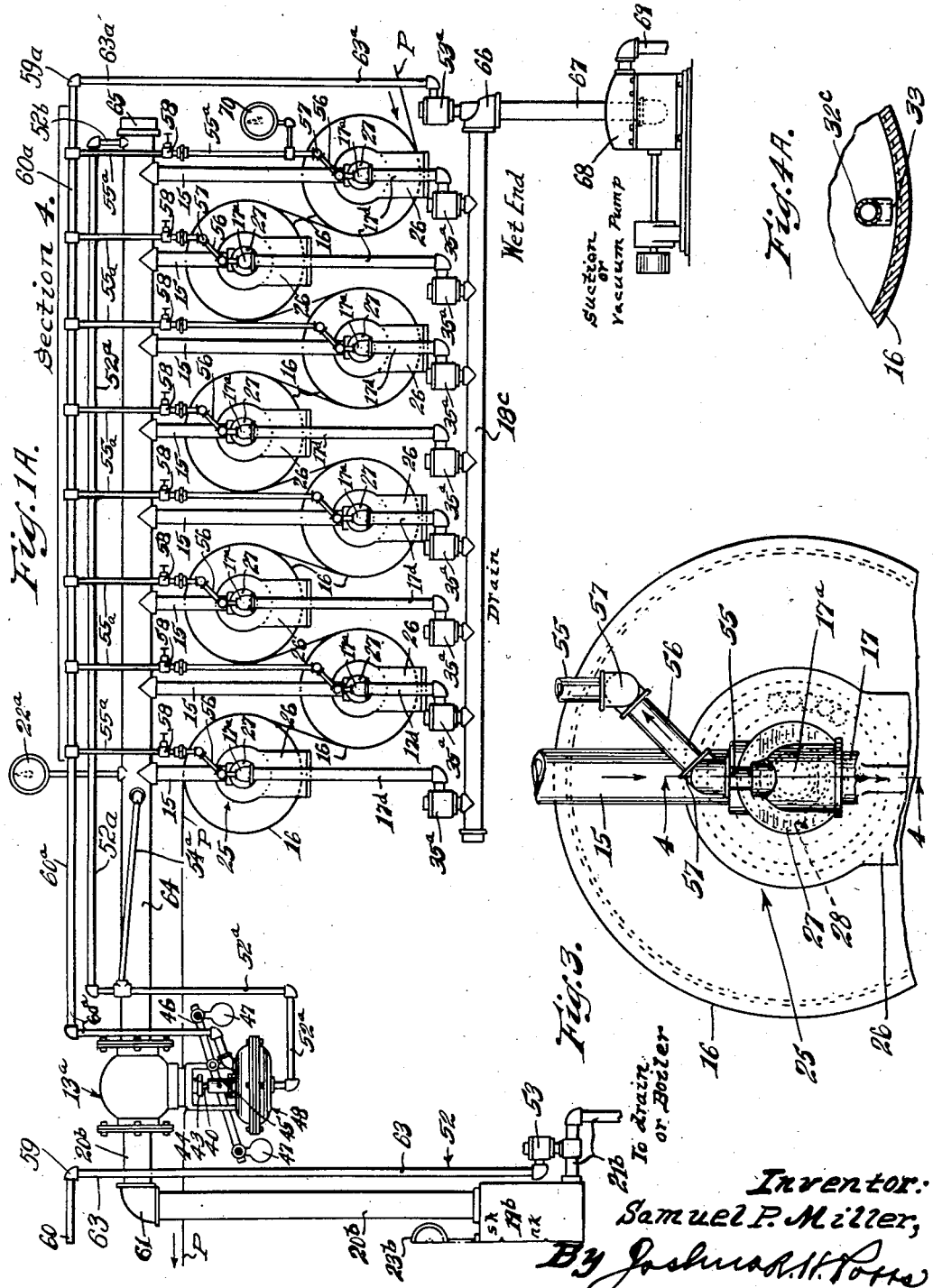
Fig. 2 is an enlarged vertical sectional view of a control or regulating and reducing valve employed in connection with my control system.
Figure 3:
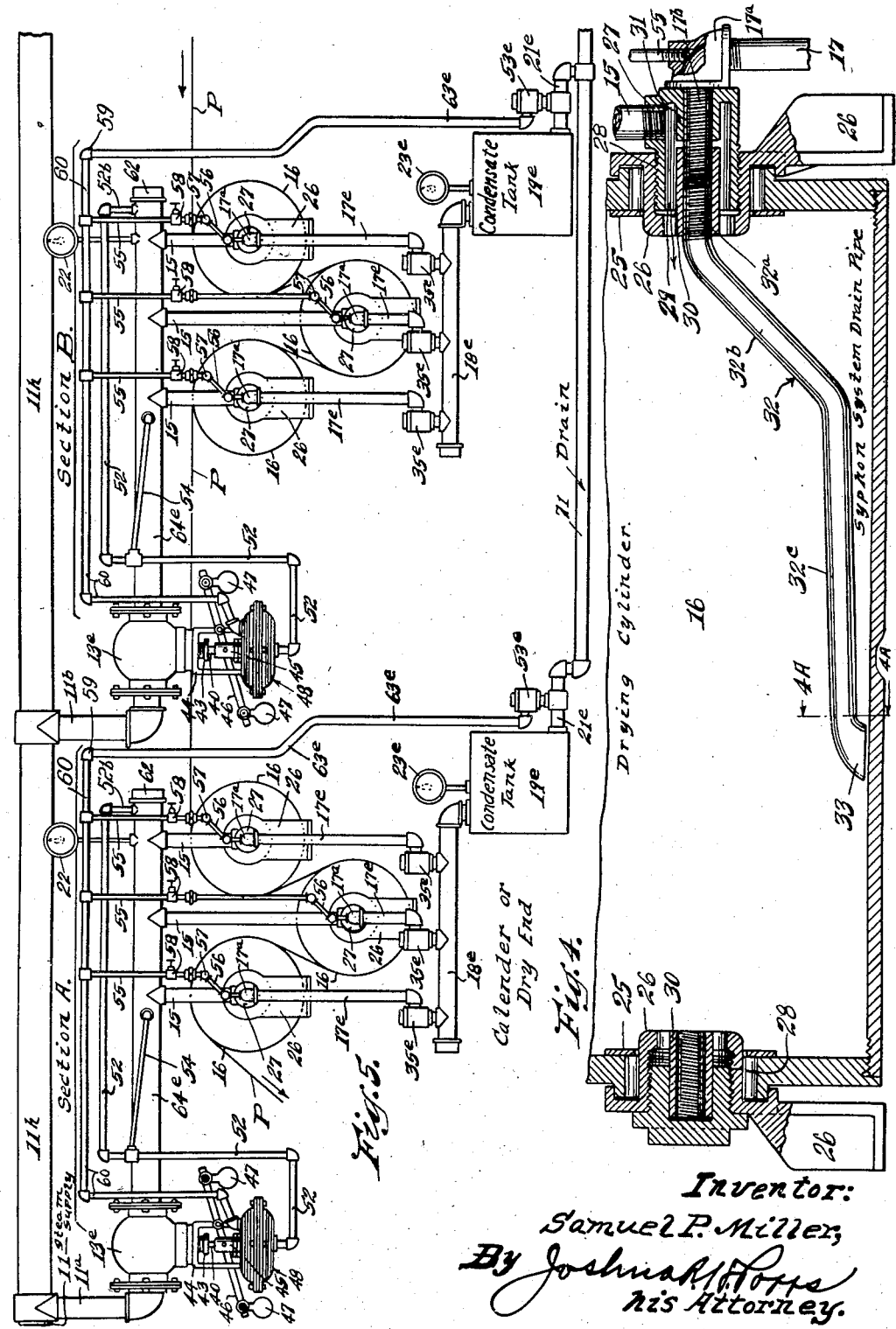
Fig. 3 is an enlarged fragmentary end elevation of one roller, with the steam supply, drain and regulating connections thereto.

The automatic regulating or reducing valve 13 controlling the supply of steam to one or more units or sections and cylinders thereof or other heat transfering elements or units is preferably constructed as shown in Fig. 2 of the drawings in which the high pressure side connected to the primary steam line 11 has an inlet or inner chamber 36 within the casing of the valve 13 and has a pair of valve seats 37 through which the steam passes and an outer or outlet chamber 38 on the opposite side of the internal wall provided with the seats 37 at the low pressure side leading to the main secondary steam line or header 14. A packing gland is connected to the valve casing as by threading the same into the lower open portion thereof through which access is obtained to the interior structure and this gland has a small bore 39 in which a stem 40 reciprocates, the stem having an enlarged upper end portion 41 provided with a pair of valves or valve heads 42 to cooperate with the seats 37 in the valve structure body. In the gland or attaching portion which receives the stem 39 is a packing gland 43 sealing around the stem and closing off the escape of steam within a frame or hanger 44 suspended from the casing. The enlarged lower portion of the stem carries or is formed with an upright post or loop 45 which is operatively connected to a balance lever 46 pivoted in the frame 44 at one side and having adjustable weights 47 on the arms thereof adapted to be set for any desired pressure operation according to the differential established or desired to be maintained as well as the pressure of the steam and degree of heat to be sustained in the transfer units or cylinders connected to the valve 13. This post 45 operates through a diaphragm casing of a pressure controlled means 48 which may be diaphragm or piston controlled. In the present instance, the post 45 is shown connected to a diaphragm 49 in the casing of pressure-controlled means 48, forming a lower pressure compartment or chamber 50 and an upper pressure compartment or chamber 51, the former of which is connected to a control pipe 52 forming part of the control or pressure equalizing system and which, in this instance, is of small diameter, preferably about one-half inch, and extends upwardly and along the secondary supply pipe 14. The pipe 52 may be arranged at any suitable level instead of below the secondary 14 and may be in line therewith or above the same, to which point it is extended as shown in Fig. 1. This pipe 52 is connected at 54 to the relatively high pressure or supply side or near end of the secondary 14 of the Section or Unit 1, but in Section 4 at the far end is connected as at 52b to the remote side or adjacent the closed far end of the remote branch manifold, header or auxiliary exhaust steam line 34 as distinguished from the branch manifolds 14 and 24, or to the latter or either. A small control pipe 60 leads from the upper pressure compartment or chamber 51 along the pipe 52 and at its far or remote end is connected to the low pressure side at the drain pipe 21b by a down pipe 63 with an interposed automatic trap valve or thermostatic steam trap 53. At the near end or high pressure side, the pipe 52 is shown connected by a smaller pipe 54, preferably about one-quarter inch in diameter, to the secondary line 14 at any suitable point along its length and preferably disposed in an inclined position away from the pipe 52 to the line 14 to drain and subject the control line to the pressure therein but preferably adjacent the branch pipes 15. Branch control lines 55 are preferably tapped into the return control or equalizer line or pipe 60 along and above the secondary line 14 in each of the respective units or sections at the low pressure sides and depend therefrom for connection with the respective rolls or cylinders at their outlets 17 at the discharge sides or ends of the rolls or cylinders 16 by connection with the elbows 17a as seen in Figs. 3 and 4. These upright downwardly extending pipes 55 are also preferably of smaller diameter than the pipes 52 and 60 or about one-quarter inch in diameter and constitute leads therefrom to the respective heat transfer elements or units such as the cylinders or rollers 16 whereby the latter are individually controlled and made much more positive and sensitive in the supply of steam thereto and discharge of used steam and drain of condensate or water therefrom than where the pipes 55 connect with the pipe 52. Loose or swing joints 56 are preferably provided in the connections 55 inclined as shown more particularly in Figs. 1 and 3 to have vertical movements to compensate and allow for expansion and contraction of the connections and the relative movements between the various parts of the heating or drying system and pipes constituting the same in connection with the cylinders. The control lines or pipes 55 may be provided with valves 58 so that each consuming unit, roll or cylinder 16 may be individually controlled or cut off for purposes of replacement or repair or any adjustment that may be needed at the far or low pressure side or end of the return equalizer or control line or pipe 60 a connection 59 is made to the return control or equalizer line or down pipe 63 which is preferably of corresponding gauge or size, that is, one-half inch diameter and this pipe 63 together with the pipe 60 extends or returns to the pressure control or operating means 48 of the reducing or feed valve 13 to form a closed circuit or loop in the control line and is connected to the upper preferably closed or sealed chamber or compartment 51 of the diaphragm casing or pressure control means 48 for actuating the valve 13 as shown more particularly in Figs. 1 and 2 of the drawings.

The flash or exhaust steam from the vaporizing tank or condensation chamber 19b is discharged through the outlet 20b, the steam having been successively reduced in pressure and heat in each succeeding section or unit so that whereas there may be a 50 or 30 pound or other reduced pressure in Section 1, this may be 30 or 20 pounds or other reduced pressure in Section 2 and 20 or 10 pounds in Section 3 or any other differential wanted, or, if the pressure is lower in Section 1, such as 10 pounds, it may be reduced to a vapor or any suitable minus or vacuum pressure of 4 to 8 inches when it reaches Section 4 at the discharge or outlet pipe or riser 20b, or, at this point, the pressure may be 5 pounds, more or less. This steam is discharged into a control or reducing valve 13a corresponding to the valve 13, similarly constructed and numbered and having a similar diaphragm or pressure control means 48 adjustable by the weights 47 to a minute degree so that the operation will be as sensitive as desired in effecting the supply of steam to the Section 4 or in cutting off the same when the various heat transfer units or cylinders have been equalized. It should be noted that instead of controlling a plurality of units as does the valve 13, the valve 13a controls a single unit, but I wish to have it understood that, in my system, the reducing valve of the primary line may be placed in multiple series with the entire load or the near and far ends of the secondary line may be placed in series by means of the control or equalizing by-pass lines 52, 60 and 63 to allow an equalizing of pressure between the near and far ends of the secondary line to be registered on the control or by-pass line or loop in addition to having separate pressures and a predetermined differential between each of the units controlled by a common equalizing or by-pass line and structure as in Figs. 1 and 6 as well as independently controlling a single or each individual unit or section as in Figs. 1A, 5, 5A and 6A so that the diaphragm in the reducing valve of the primary line being in communication with the control or by-pass line, the pressure on the diaphragm will vary according to the rate of condensation in the heat transfer units or cylinders and the condensing units. Thus, exhaust steam may be used below or above atmospheric pressure for heating systems or at sub-atmospheric pressure in such systems or other heat transfer or condensing units or elements thereof where the condensation is either low or very rapid. In low or vacuum pressure systems, there will be an efficient and economical heat and reducing of back pressure on the engine generating the exhaust steam and at the suction or vacuum pump and the initial steam may be reduced from 35 pounds to 19 pounds or less per hour per horsepower at definite inches of vacuum and the arrangement entirely eliminates all of the disadvantages of the necessity of using water for condensation in cases where exhaust steam is used for heating or process work at or above atmospheric pressure.

In Fig. 1A or Section 4, the cylinders 16 are the same as previously described, and, in this instance, I have illustrated 8 of such cylinders around which the paper P passes instead of three or more cylinders, as described in connection with the previous sections, but it is to be understood that any number may be employed as found practicable. In connection with the secondary pipes or headers 24 and 34, the risers 20 and 20a may be connected to the horizontal headers by elbows 61, the same as in connection with the pipe or riser 20b and its horizontal connection with the valve 13a and the ends of the headers or manifolds 14, 24 and 34 are closed and may be done by end caps or plugs 62 after the last heat transfer unit or cylinder or beyond the points of connection and communication of the headers or manifolds 14, 24 and 34 with the rolls or cylinders 16 by the inlets 15.

Whereas the high pressure side of the valve 13a is connected to the pipe 20b forming an outlet from the flash tank or condensation chamber 19b, the low pressure side or outlet is connected to another secondary header or manifold pipe 64, which, in addition to being independently controlled, is, like the secondary manifolds 14, 24 and 34, auxiliary or subsidiary to the primary or main steam line 11 and the manifold 64 is provided with an end cap or plug 65 together with the corresponding branch steam supply pipes 15 leading to the cylinders 16 and the other connections and structure, the same as previously described in connection with Figs. 1, 3, 4, and 4A, but, in this instance, the outlets or drains are indicated at 17d leading into the common bottom return pipe, drain or outlet manifold 18c and discharging through an elbow 66, which may be similar to the elbows 17a, into a discharge pipe 67 connected to a constant, steady or continuous vacuum, or suction producing means such as a vacuum or suction pump 68 which may be either the rotary or reciprocating type but preferably the former, from which a pipe 69 leads to return to the boiler such as to the steam trap or feed water system thereof, steam supply, to a generating engine, exhaust, to a drain or to a hot well. A gauge 22a may be provided upon the manifold pipe 64 corresponding to the gauge 22 and thermostatic traps 35a may be interposed in the drain pipes 17d the same as the traps 35 in the drain pipes 17c for similar function or action. The control or equalizing lines of reduced diameter, as heretofore specified, include a pipe 52a corresponding to the pipe 52 and connected to the lower pressure compartment or chamber 50 of the diaphragm or piston casing 48 thereof controlling the valve 13a, and extending above the manifold 64 for connection at its far end as at 52b to the corresponding far or closed end 65 of the manifold 64. A return pipe 60a like the pipe 60 leads into the upper chamber 51 of the valve 13a and extends along or above the pipe 52a and at its remote end connects at 59a with a down or upright return pipe 63a connected to the elbow 66 at the far end or low pressure side, as of the drain 18c with an interposed thermostatic trap valve 53a corresponding to the thermostatic valve or trap 53. A gauge 70 may be provided on any of the depending branch control lines 55a corresponding to the tapped control lines 55 but is shown on the last one at the far end of the Section or unit 4 to obtain the pressure at this point. The gauges 22, 22a, 23, 23a, 23b and 70 may be used for inspection so that if any correction, readjustment, replacement or repair is needed, it may be quickly effected though, usually, this will not be necessary. The return of the loop or circuit of the equalizer or control line is made through the pipe 60a which has connection at 59a to the down pipe 63a at the top of the latter and the pipe 60a is connected at its near end to the upper pressure compartment or chamber 51 of the diaphragm or piston casing 48 of the valve 13a, the same as the pipe 60 previously described in connection with the valve 13.

In the operation of the system as described and with the valve 12 open the desired degree, steam from the supply source is admitted into the primary line 11 to pass into the inlet chamber 36 of the valve 13. Previously, this valve is adjusted by moving the weights 47 along the lever 46 at the ends of the arms thereof to establish a predetermined pressure difference or differential between the first and last or successive units of the different sections of the heat transfer or drying system, which may be radiators or otherwise, and shown, in this instance, as cylinders having a high or low percentage of condensation or absorption depending upon the particular application and use of the system. The valves 42 being unseated to permit the steam at the required pressure to enter the secondary line 14, pass through pipes 15 into the cylinders 16, while some of this steam is by-passed, that is, part thereof passes into the small control pipe 54 to the pipe 52 from whence it passes into the chamber 50 of the control device 46 and pushes upwardly on the piston or diaphragm 49 together with the post 45 and stem 40 tending to or to set the valves 42 against their seats 37. This steam also passes into the various pipes 15 to cylinders 16, 52 to manifold 34, 55, 60 and 63 of the control lines, and the valves 58 being open, passes from the cylinders 16 through the swing joints 56 at the elbows or fittings 17a and pipes 55 to pipes 60 and 63, the steam from the secondary 14 having previously passed into the cylinders through the branch pipes 15 by their connection with the cylinders at the passages 29. In this case, there is no direct connection from the secondary 14 or secondaries 24 and 34 to the upper pressure chamber 51, and consequently the steam in the pipe 52 will follow the line of least resistance, and since the steam in the pipes 60 and 63 cannot pass the trap 53 into the drain 21b from the flash tanks or condensation collection chambers, it will pass into the pipe 60 through the outlet pipes or control lines 55, tending to establish an equilibrium or equalize the pressure therein with the steam pressure in the pipe 52 and consequently will pass into the upper chamber 51 therefrom but at such pressure as not to prevent seating of the valves 42, although normally the pressure in the lower chamber 50 on the lower face of the diaphragm 49 will tend to force it upwardly with or against the weights 47 and thus decrease the opening of the valves 42 to reduce or admit steam from the primary 11 to the secondary 14 or close valves 42 when the pressure in the line 52 exceeds a certain point or tends to equalize with the pressure in the remaining control lines 60 and vice versa or, when in some cases, at a low, minus or vacuum pressure. The machine being operated, the percentage of condensation and absorption in the cylinders 16 in heating and drying the paper is quite high, and this condensate with a variance or differential of 2 pounds or 2 inches of vacuum pressure between the branch inlets 15 and the outlets 17 will exert a constant, steady and relatively uniform suction or vacuum pressure to continually cause circulation of the steam and discharge of the exhaust or used steam and of any additional differential or vacuum pressure difference to lift or siphon the water of condensation from the cylinders 16 so that the condensate will pass out through the siphoning pipes 32 and be discharged through the outlet pipes 17 and drain manifold 18 to the flash tank or condensate chamber 19 as the cylinders revolve in contact with the paper P under tension. The exhaust or used steam passing into the tank 19 will heat the water and vapor in the tank causing additional steam to be generated at a lower pressure than originally supplied and passed therewith into the outlet or riser 20 to the manifold or header 24 constituting the secondary of the next unit or Section 2 and the same operation will be repeated in this section with drain through the outlets 17, return 18a and flash tank 19a while the water also drains through the pipes 21 and 21a to successive tanks for discharge at 21b to drain or to return to the boiler.

However, the pressure in the second section or unit will be lower so that it will operate at a lower temperature and this will be successively reduced in Section 3 at a still lower pressure and temperature, but whereas the drain through the pipes 17, 18 and 18a will be unimpeded so as to permit the used steam to exhaust therewith and pass above into the manifolds 24 and 34, the latter through the outlet 20a from the flash tank 19a, the steam from the cylinders 16 of Section or unit 3, each made up of a plurality of transfer units or cylinders such as indicated at 16, will be trapped or prevented from passing through the outlets 17c by the thermostatic traps or trap valves 35 since these traps will permit water to pass at a low temperature but will not permit steam to pass, nor will it occasion any apparent loss in the steam pressure and will close under a certain temperature for which set under the action of the steam in the outlets 17c, such steam will pass out through the outlet or riser 20b to the valve 13a to be supplied to the manifold 64 of Section 4 and corresponding elements and pipes thereof in the same manner as in connection with Sections 1, 2 and 3, but at a lower pressure and temperature at the feed or wet end of the machine where the web of paper or cloth enters on the rollers 16. As the paper or pulp web P is fed in at the wet end, which is at the lowest temperature, it will be subjected successively to higher temperatures in the succeeding sections progressively toward the calender or dry end where the finished paper is discharged and in this form, any number of sections may be simultaneously controlled but depend on the travel and exhaust of steam or vapor from one section to the next to establish a differential between different sections from the highest to the lowest of the sections jointly controlled by a single control means but directly controlled by the latter. When the temperature and pressure is equalized or such in the pipes 52 or 52a and lower chambers 50 or higher than in the pipes 60 or 60a and upper chamber 51 according to the setting of the weights 47 of the levers 46 of the control device 46 or other control device which may be used, as to raise or push the diaphragm 49 upwardly or permit the rise thereof, the valves 42 will be closed and the supply of steam cut off, this being normally caused by the direct connection of the line 52 with the secondary 14 at the pipe 54 and a manifold such as 34 or 64, at its remote end as at 52b, which pipe 54, as before stated, is preferably inclined to drain all moisture therefrom and avoid obstruction by water or gas pockets or banks. Whether operating at vacuum or higher pressure and as applied to steam or heat transfer or consuming units in the form of cylinders or otherwise, should the pressure in any secondary 14, 24 or 34 or in any of the cylinders 16 and lines 55 fall below a certain point at which the device is set to operate, this will immediately lower the pressure in the pipe 52 or raise the pressure in the pipe 60, to permit the diaphragm 49 to move down as shown in Fig. 2 and open the valves 42 to admit steam to the secondary 14 and the entire system as previously described due to the unbalancing of the lever 46 from its adjusted position after being equalized and due to the steam following the line of least resistance or entering the pipe having the smallest pressure therein and continuing to do so until the pressures are equal in both pipes 52 and 60 and chambers 50 and 51, or depending upon the adjustment of the weights 47 sufficient to raise the piston or diaphragm 49 to close valves 42 even though the pressures may be slightly unbalanced. Since the pressures in the pipes are sufficiently great, the valves will remain closed. This action will take place in any one of the secondaries or in any cylinder so that each set of cylinders or each unit will actuate the control mechanism to admit steam for simultaneous or individual control so that the entire system will be readjusted or operate to maintain a certain predetermined adjustment or differential for which it is set. By having the control or by-pass lines connected to both sides of the diaphragm which actuates the control or reducing valve by the control lines or pipes 52 or 52a connected to the far end of the secondary such as 34 or 64 and at 54 or 54a with the near end of a secondary such as 14 or 64, and the pipes 55 at the low pressure sides or exhaust outlets 17, 17c and 17d to the return control lines or pipes 60 or 60a, the regulation becomes much more sensitive, quicker and more accurate and is especially adapted for paper making machines but will operate in connection with other heat transfer systems using cylinders, radiators, or otherwise. The reducing valves 13 or 13a may be set to operate at any desired pressure or to close or open on a balanced or an unbalanced pressure at opposite sides depending upon the adjustment thereof as by the weights 47 and in low pressure or vacuum systems may be set at 10 inches of vacuum and the vacuum pump may be set to maintain a vacuum of 12 inches which gives a differential of 2 inches for causing circulation or discharge of condensate or water. This will allow a temperature of steam in the control or by-pass lines 52 and 60 to be maintained at the temperature of steam at 10 inches of vacuum, and when the thermostatic trap 53 or the traps 35 start to open at this temperature or pressure, this will allow 12 inches of vacuum in the return lines to pass to the control or by-pass line and lower the pressure in the secondary line as well as under or depending on the adjustment thereof, at both sides of the diaphragm of the reducing valve structure 13, thus causing the valves 42 to open to admit more steam to the system until the temperatures and pressures in the control lines have reached the set temperature and pressure when the system and themostatic traps 35 and 53 or 35a and 53a will be closed, cutting off the vacuum pump from the return control or by-pass line 60 or 60a. The thermostatic traps will be set, adjusted or balanced to maintain the degrees of heat throughout the heating system at the temperature of steam at which the reducing valve is set, but, this temperature and pressure will be affected by the condensation and absorption in each unit, section or set of cylinders, as well as in each individual cylinder constituting one form of steam or heat transfer or consuming unit so that the entire transfer system will be affected to effectually maintain the desired temperature and pressure throughout, at and from any point in the system. This will also affect the operation of Section 4 by controlling the exhaust or flash steam entering the pipe 20b and the thermostatic valves 35 and 53 will maintain the temperatures in Section 3 and the preceding Sections 1 and 2, while maintained at successively higher temperatures and pressures, receive and dry the paper web in a reverse order insofar as the volume of moisture therein is concerned. Section 4, however, will be independently controlled at the valve 13a in the same manner at any point in the system by a drop in pressure and temperature or by the opening of any of the steam traps 35a or the trap 53a which is particularly affected by the action of the exhaust or suction pump 68 at the desired differential or pressure lower than in the control lines whether at a minus pressure or vacuum, or a high or positive pressure. Thus, the control or reducing valves 13 and 13a are normally closed to cut off the supply of steam and no opening thereof will occur until the equalization of pressure occurs in the control lines or sufficient pressure differential to overbalance the action of the weights so as to depress the diaphragm or piston 49 and unseat the valves 42 to admit additional steam until such time as the pressures adjust themselves to raise the diaphragm or piston 49 to close the valves 42.

Figure 5:
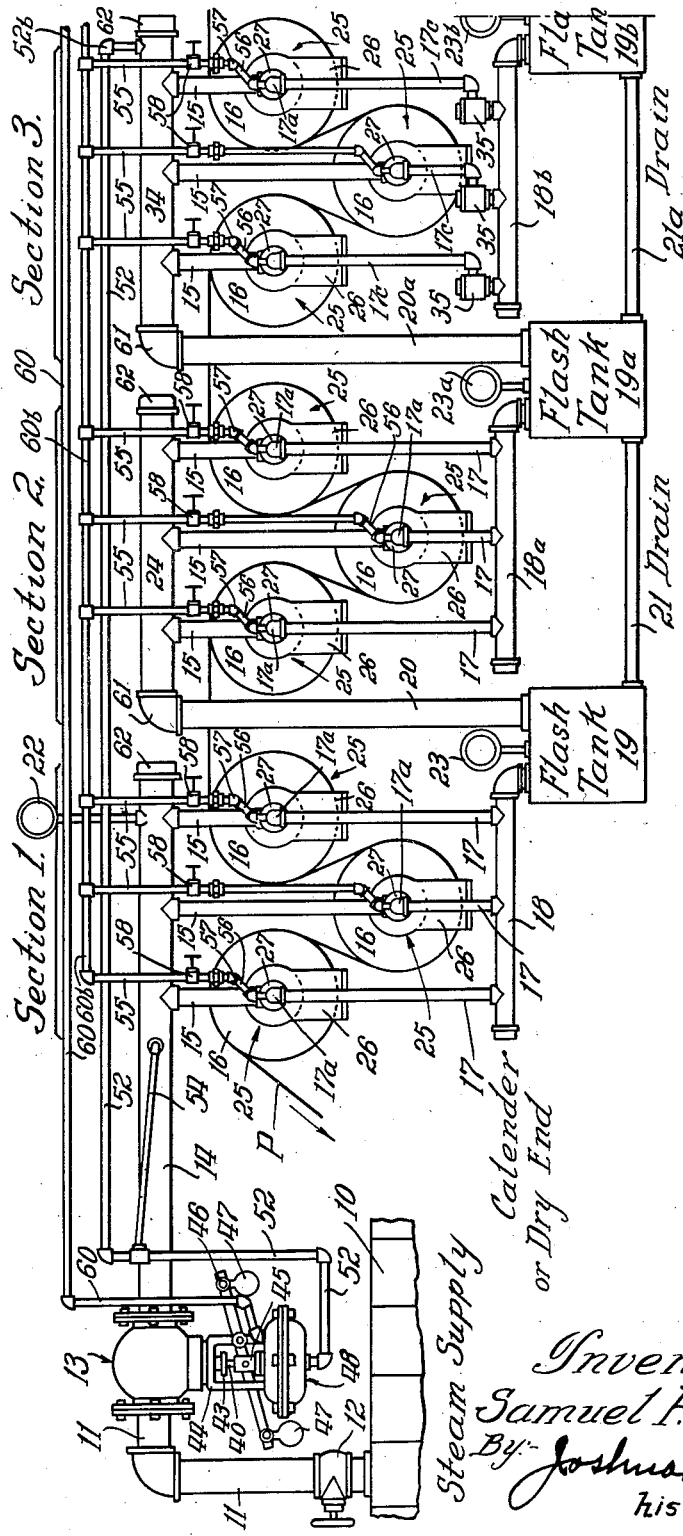

In the form of the invention shown in Figs. 5 and 5A, instead of having a multiple of sets or units of heat transfer or steam consuming devices or cylinders, all controlled by a single valve and control line or means in series or otherwise as in Figs. 1 and 1A, each of the units designated as Sections A, B, C and D are independently controlled by separate valves and control lines instead of merely the last section with lowest pressure and temperature such as Section 4 in Fig. 1A which is so controlled because it is desired to maintain the same at a lower temperature at the wet or entering end of the paper web where it is undesirable to expose the same to a high temperature or degree of heat. While not limited to such use, the arrangement shown in Figs. 5 and 5A is especially adapted for a thin web of paper or cloth such as soft or tissue paper, particularly because it lends itself to extremely sensitive control and where the heat and steam pressure may be as high or as low as desired with large or small differentials between the different sections. In this form, the construction and arrangement for each section is substantially the same as previously described for a plurality of sections as in Fig. 1 or a single section as in Fig. 1A, although, in this form, low pressure or exhaust steam, vapor, live steam or exhaust and live steam together may also be used. As illustrated, the primary steam line 11 is adapted to be connected to a source of steam supply from a boiler, engine or otherwise, not shown, and communicates with a common header or main 11h running as far as Section D, which is the last section or far end of the system at the lowest temperature and pressure, but the first or entering section for the paper at the wet end of the machine. From the header 11h extend branches 11a, 11b, 11c and 11d to the different secondaries 64e through regulating supply or control valves 13e which are of the reducing type as previously described and similarly constructed and controlled. From the secondaries 64e branch pipes 15 extend to the steam consuming units or cylinders 16 which are provided with outlets or drains 17e corresponding to the outlets 17, 17c and 17d previously described. Each of these outlets is provided with an adjustable automatic steam trap or valve 35e adjacent the drain pipe 18e similar to the drain pipes 18, 18a, 18b and 18c. These pipes in Sections A, B and C lead into condensation collecting chambers or receptacles, or condensate tanks 19e which empty through outlets or discharge pipes 21e into a common drain or manifold 71 and have down or upright return pipes 63e like pipes 63 and 63a as in Sections 3 and 4, connected through pipe connections 59 with the control lines 60, the latter extending to the top diaphragm chambers while the pipes 52 extend to the bottom chambers and are connected at their far or remote ends as at 52b to the far or remote ends of the secondaries 64e of the high pressure sides of the system sections, for sensitive control therefrom. A thermostatic trap valve 53e is also interposed in each pipe line 63e adjacent the drain or discharge 21e and operates in the same way as the trap valve 53a. Each of the condensation collecting receptacles or tanks 19e is provided with a temperature and pressure gauge 23e, but there is no discharge from the condensate tanks to each succeeding unit with relation to the feed of steam or each preceding unit with relation to the feed of the web as each section receives its individual supply of steam from the header 11h direct through the branches 11a, 11b, 11c and 11d. In Section D, the condensate tank 19e is omitted and the drain manifold 18e is connected directly by a pipe 67e to the drain manifold 71 at 72 shown as a T connection although, generally speaking, I have not desired to be limited to any form of pipe connection, and, for this purpose, have omitted the specific reference to most of the pipe connections throughout the description except where specifically described to bring out a particular function. In this instance, the discharge from the pipe 67e and the drain 71 at the connection 72 leads into a suction or vacuum pump 68e having a discharge 69e to drain, for return to the boiler or to a hot well. The pump 68e is designed to create a suction or vacuum pressure in the drain line to discharge the condensate passing through the trap valves 35e and 53e, the latter of which is connected by a special fitting or elbow between the pipes 18e and 67e in Section D as at 67a and has a down or upright return pipe 63e forming part of the control means connected through the connection 59 with the pipe 60 instead of being positioned at the discharge end of a condensate tank 19e as in the previous Sections A, B and C. In this way, any required differential may be established at the end of the machine to lower the pressure in the down and control lines to clear the machine of condensate. Also, each section and each individual cylinder is independently controlled and adapted to operate at any desired pressure above or below atmospheric pressure with any desired differential between adjoining sections or between the first and last or any of the other sections of the system. Thus, in this case, each section is independently controlled and maintained with a fixed or a tapered difference in pressures and temperatures between the various sections or between the inlets and outlets of steam, exhaust and condensate of each section, unit or roll of any number of sections, units or rolls instead of all being simultaneously controlled or placed in multiple series with a common supply for steam or with the entire load, but it will also be understood that the near and far ends of the secondary line or any other suitable units or sections thereof may be placed in series by means of the control or by-pass pipe and from different sources, or the same source, or independently or simultaneously receive its supply of live or exhaust steam or vapor but that, in each instance, the arrangement of the discharge and drain pipes is such as to maintain a constant differential between the inlet and outlet of each unit, cylinder or roll to steadily and continually lift or draw and discharge all condensate which would tend to block complete and free circulation of the steam and gases and avoid pockets, banks or other obstructions due to the presence of non-condensable gases, condensate or otherwise, particularly where a suction or vacuum pump is provided at the discharge end. In each cylinder, with say 10 inches of vacuum pressure, two pounds or inches pressure difference between the inlet and outlet is usually sufficient to cause good circulation and this or any additional differential or a vacuum up to 18 inches may be produced by my control system to lift the water 36 inches or 3 feet, as required for maximum sized rolls usually 60 inches or 5 feet in diameter, to cause the complete siphoning and discharge of the water of condensation through the siphon system or pipes thereof and in this way, an effective and uniform heating is maintained according to any desired predetermined differential or set temperature. Also, the control lines being arranged in a continuous loop or circuit, will be readily cleaned out and subject to sensitive control to operate the supply valves leading into the different secondaries and heat or steam consuming units which may take the form of any heat transfer unit such as drying cylinders, radiators or otherwise. Banks of gases, steam or vapor is prevented by the gas equalizing or control lines and the reducing valves may be set to step or taper the pressure and temperature in the entire set of rolls or cylinders, in addition to controlling and equalizing each individual roll or cylinder and preventing the same from air or gas binding or from creating a vacuum or going to a lower pressure than that for which it is set, due to the rapid condensation of the steam therein as lowering of the pressure to such set point will immediately result in opening the supply or reducing valves and maintenance of the pressure desired. Also, it will be understood that the return or drain from the rolls may be trapped or not as desired, and a steady or fixed differential established to allow a steady flow of steam to each cylinder with exact temperatures provided for and to cause a more even and uniform drying of the paper. The equalizing control lines also vent each roll or cylinder separately allowing non-condensable gases to flow up from each roll or cylinder and pass or be carried off by down pipes 63 and 63e and the condensate flow down from each roll by the outlets or drain pipes 17e and 18e to the down pipes 63 and 63e and then to the drain 71 for draining or returning the same to the steam generating system or boiler. The means which I have provided is simple as each cylinder or heat transfer element is provided with a riser, down or drain and return pipes 17 and 55 and the return lines are connected with the pressure or diaphragm chamber on opposite sides of the piston or diaphragm therein by means of the control or by-pass pipes such as 52—60 which may be connected to a vacuum pump through the intervention of an automatic trap valve such as 35, 53, 35a, 53a, 35e and 53e to pass water or moisture but prevent the passage of steam or vapor at a certain temperature for which adjusted, as previously described. By providing a thermostatic trap valve in the line of the vacuum pump of the control or by-pass lines, extremely accurate regulation is insured together with a uniform maintenance of pressure and temperature in the different sections or units, each thermostatic trap valve being set to open at a definite temperature so that the vacuum pump will operate to cause the control lines to exert increased suction on the diaphragm of the reducing valve to admit additional steam as desired. The device also accurately controls the amount of vacuum or pressure in the heating system to admit steam from a primary line through a reducing valve to one or more units individually or simultaneously in series. It will also be seen that fresh, live or exhaust steam or a combination thereof may be used in the system controlling certain units, sections or sets of the heat transfer or consuming units of the system whether cylinders, radiators or otherwise. In view of the description of the operation of the form of the invention shown in Figs. 1 and 1A, and the fact that Section 4 is independently controlled even though fed with used or exhaust steam, as well as the fact that each of the units of Figs. 5 and 5A or Sections A, B, C and D is independently controlled from the main steam supply and that each regulating or reducing valve 13e is set at different temperatures and pressures and to open at such adjustment to maintain a desired differential or difference between the units or sections, or between the inlets and outlets of each section or unit, transfer or consuming element or roll, or to step or taper the same as desired, between any and all of the sections, it is thought that the operation of this form of the invention shown in Figs. 5 and 5A will be readily apparent to any one skilled in the art in view of the foregoing description of the operation, and, for this reason, further description thereof is omitted. However, it may be mentioned that installations of the foregoing systems have accomplished an average or mean saving of approximately 20% with complete automatic control and without manual effort or human intervention, especially due to the fact that slight unbalancing of the pressure or temperature away from an established differential for which the device is set will, through the control pipes and the lack of expansion prevented by the system, result in immediate opening of the supply valves with greatly improved operation and increase in efficiency of the heating or product produced therefrom.

Attention is called to the fact that in the forms of the invention shown in Figs. 1 and 1A and Figs. 5 and 5A wherein the risers or control vent pipes 55 and 55a are connected directly to the return pipes 60 and 60a or tapped thereinto by T-joints, as shown, so to lead directly into the upper chambers 51 of the pressure control devices 48 at and from the far end or low pressure side, and at and from the far end of the low pressure side of each section to the down or return pipes 63 and 63a, while the control pipes 52 and 52a are connected at one end directly to the lower chambers 50 of said control devices 48 at and from the near end of the high pressure side by reason of the connections 54 and 54a thereof with the secondaries 14 and 64 or 64e, and at the opposite ends thereof with said secondaries at 52b independently of and without any direct connection with the pipes 60 or 60a and 63 or 63a, the pressures and temperatures of steam in any section from the beginning to the end or from the dry end to the wet or calender end may be tapered or stepped in the entire set of driers due to the connection of the upper chamber 51 of each control device 48 leading directly from the left hand connection 55 of each steam consuming or heat transfer element, unit or roll 16 and correspondingly affected by the pressures and temperatures in said rolls or cylinders. Also, it is to be understood that exhaust steam can be used as well as live steam or a combination of exhaust and live steam. However, where it is more particularly desired to keep up or maintain the pressures and temperatures in each section or roll and particularly higher than formerly, through any section of rolls or the entire set of rolls of the machine or apparatus, the forms of the invention shown in Figs. 6 and 6A and Figs. 7 and 7A are preferably employed. In these figures or forms, the outlet control or vent pipes 55 and 55a, instead of being connected to the return line or pipe 60 and 60a leading directly to the upper chamber 51 of each control device 48, they are connected to a separate and independent control line or pipe 60b shown interposed between and along the pipes 52 and 60 or 52a and 60a and extending only as far as the last cylinder or roll 16 at the calender or dry end of the machine at section 1 and extending along sections 2 and 3 or at the corresponding end of section 4 and represented by an elbow at the connection thereof with the last or end pipe 55 and with no direct connection to an upper chamber 51. Instead, the opposite remote or far end of each pipe 60b is connected at 60c to the down pipe 63 or 63a and a connection is also made at this point, as indicated at 59 or 59a, to the pipes 60 and 60a as previously described. In this way, instead of controlling the various rolls, cylinders or units 16 from the inner or discharge end, they are progressively controlled from the far or receiving end at the low pressure side of the machine or each section thereof as represented by the sections 3 and 4. In other words, the direct connection of the pipes 55 with an upper chamber 51 adjacent a control or reducing valve 13 or 13a is omitted and the connection of the units or rolls with the upper chamber 51 only made at the opposite end of and through the pipes 60 and 60a, so that the pressure and temperature in any section or roll affects the other sections or rolls having connection with the pipes 60b, so that the same are effectively controlled to maintain the pressures and temperatures therein by opening the reducing valves from a condition in any or all sections or rolls to thereby maintain a higher and more accurately uniform pressure and temperature in any section or roll. The arrangement shown in so far as the sections are concerned corresponds to that illustrated in Figs. 1 and 1A.

Figure 6:
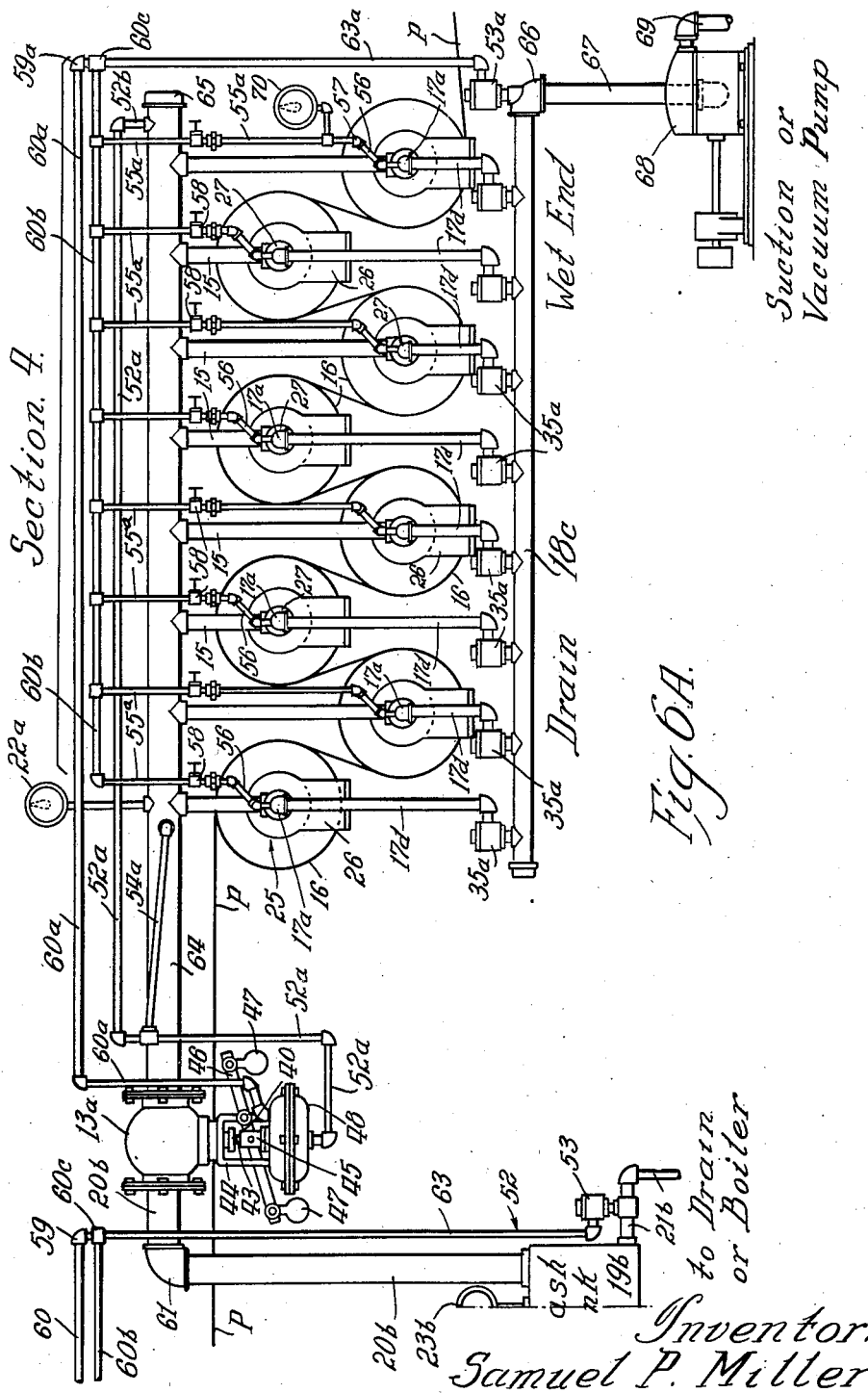
Figure 7:
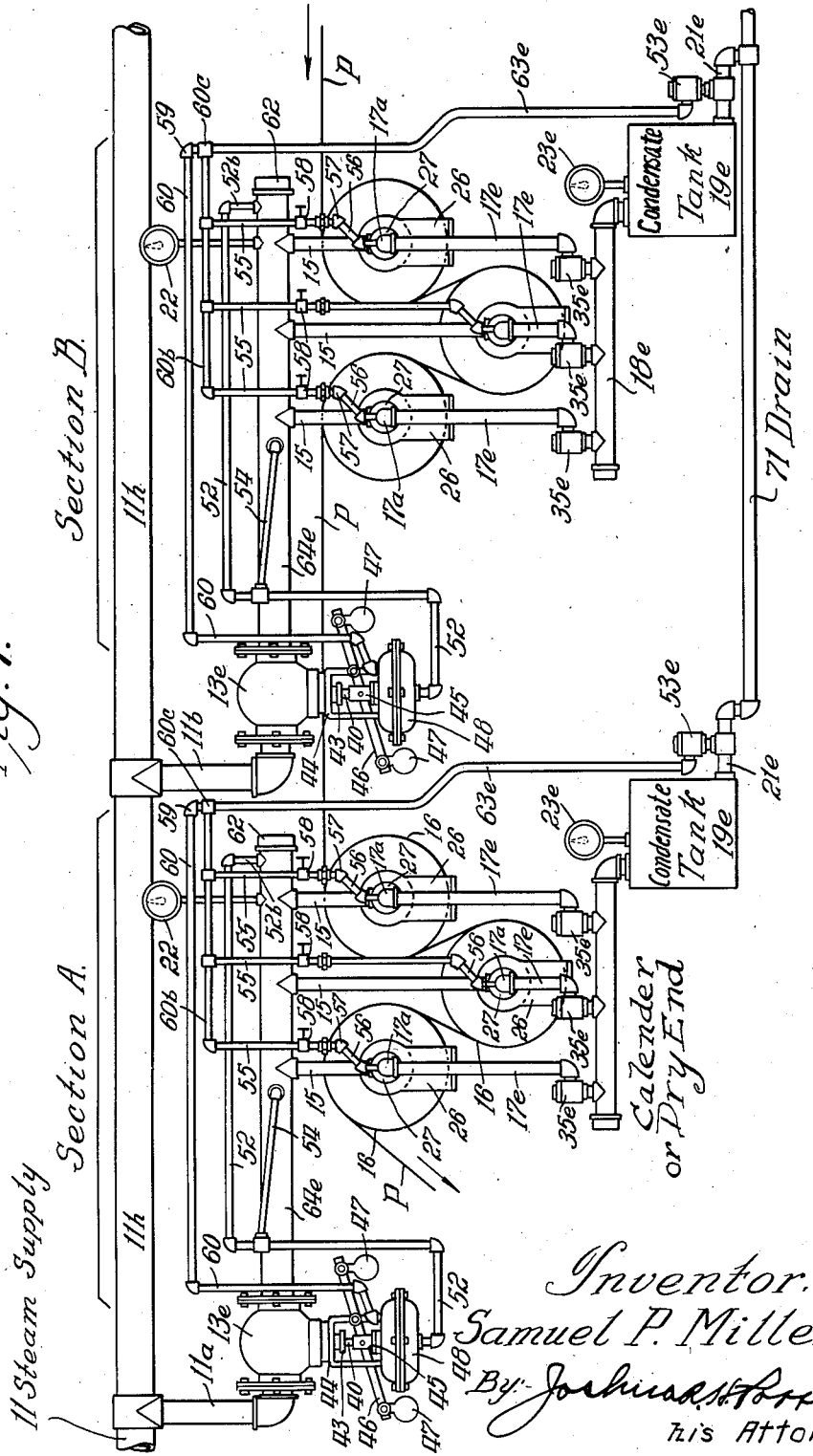
Figs. 7 and 7A are a diagrammatic side elevation corresponding to Figs. 5 and 5A of another form of control system.
Figure 7A:
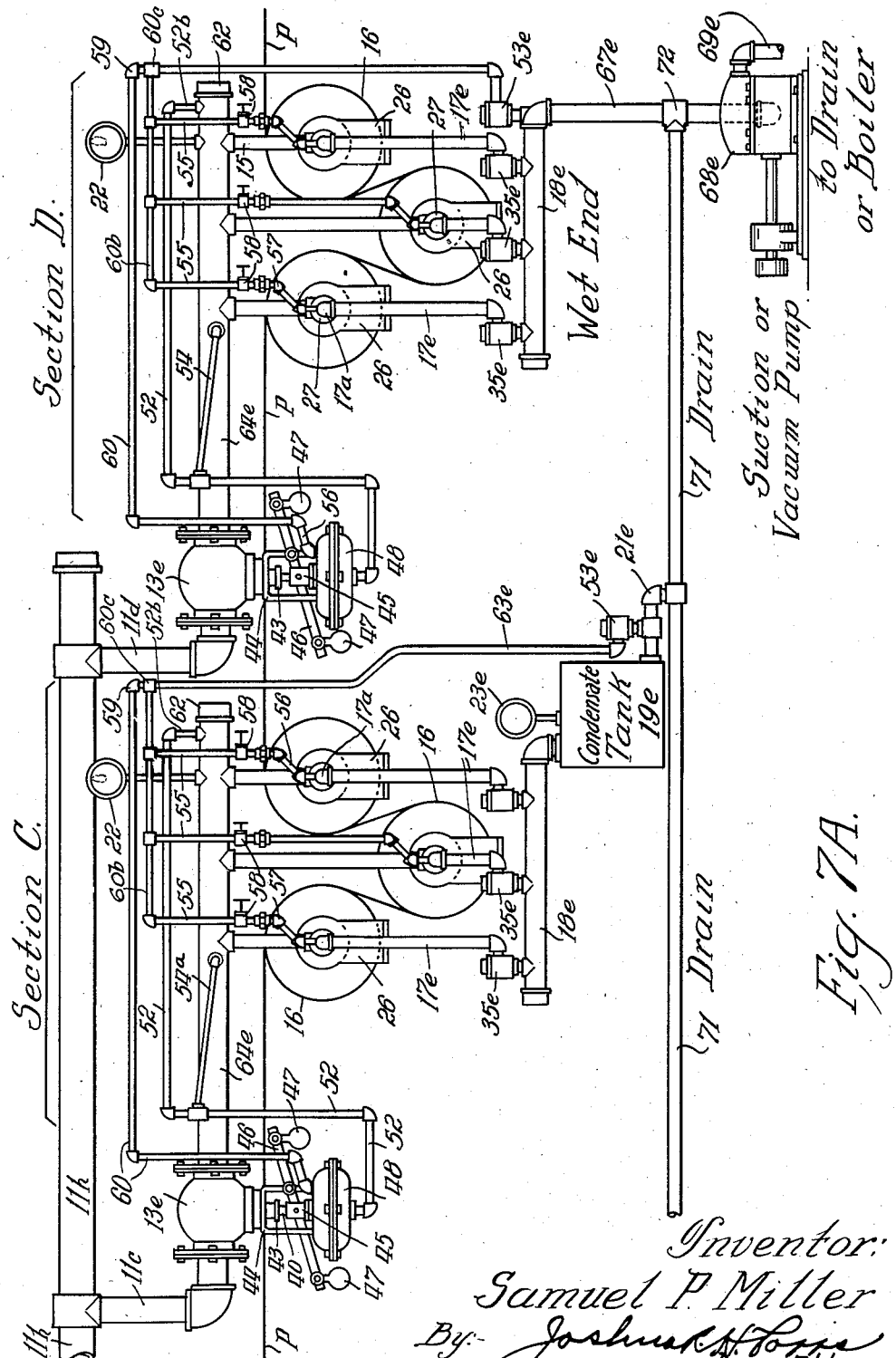

In the form shown in Figs. 7 and 7A, which corresponds to the arrangement of sections and reducing valves shown in Figs. 5 and 5A, the construction and relative connection of the pipes 55 to the pipes 60b as in Figs. 6 and 6A, and 63e corresponding to the pipes 63 and 63a in Figs. 1A and 6A at 60c and the connection thereof at 59 with the pipes 60 also corresponds with the connections at 59 and 59a with the pipes 60 and 60a respectively in Figs. 5, 5A and 1A and 6A. The pipes 52 and 52a in all forms are maintained in the same arrangement or connections thereof with the lower chambers 50 of the control device 48 of the reducing valves 13 and 13a or 13e as well as with the pipes 54 and 54a to the secondaries 14 and 64, as shown in Figs. 6 and 6A and represented in Figs. 5, 5A, 7 and 7A by the corresponding secondaries 64e of each section A, B, C and D thereof. Also, the connections 52b between the far ends of the pipes 52 or 52a and the corresponding far or remote ends of the secondaries 64e are maintained, the same is in connection with the secondaries 34 and 64 and the previously described forms or arrangements of control pipes in other figures. Otherwise, the construction is as previously described.

By reason of the constructions described and the arrangements of pipes, particularly with reference to Figs. 6 and 6A and 7 and 7A of the drawings, I am able to maintain a fixed difference in pressures between the inlet and outlet of steam or exhaust and condensate of each section or unit which may be formed by a drum, cylinder or roll when desired, or the pressure and temperature may be tapered, such as in connection with paper drying rolls of any number in a unit or section or in the entire machine comprising a plurality of sections from the finishing end to the feeding, wet or entering end of the machine or web. For example, 50 pounds of steam pressure may be provided at the finishing end and tapering to 5 pounds of pressure at the feed or wet end where the web enters the machine or even 10 or 15 inches of vacuum as the inlet of each roll is controlled from the lower side of the diaphragm of each control device of a reducing valve with the control lines 52 and 52a connected to the lower chambers 50 of the diaphragm or piston control devices 48 by the pressures therein in series with the inner end of the header or secondaries, feeding all rollers and extending to the farthest end of the same header or secondary, so that the control or reducing valve lever 46 in each instance can be weighted at 47 to have 50 pounds on the near end and taper down as the steam is taken off for each unit or section until the last unit or section would be in a vacuum pressure. The less the weight against the diaphragm, the higher the pressure will be at the further end of the same header or secondary and when properly weighted the farthest end could have practically the same pressure as the starting end, as for example, when the steam stops flowing in the control line, the pressure would be the same in both ends of the header or secondary, and the other side of the pressure chamber or diaphragm is connected through a control line 60 or 60a at the top side of the diaphragm to the outlet 55 of the last roll at the control pipe connection 55 or 55a, so as to take steam off of the header and continuing tapering the pressure in each roll until it reaches the first roll in the set that takes steam off of the first header or secondary and subsequently in the other headers or secondaries down stream, so to speak, to the far end of the machine, after passing the reducing valve. The other end of the control line and header in each instance connects to the diaphragm at the top, while the other control pipe connects to the diaphragm at the bottom, and this arrangement allows the outlets of each roll or successive rolls to taper in pressure in direct proportion to the pressures entering the same roll. Therefore, the top side of the diaphragm can be weighted to keep a set differential across each section or unit, so that the steam entering and leaving each unit at any set difference in pressure between an inlet and outlet will be maintained. The same set or sets of paper rolls may be operated in a vacuum to get a lower pressure and temperature in case of rolling light, thin sheet material, such as paper or cloth, and this is very desirable, as high pressures and temperatures will cause embrittlement of light paper or result in the same being hard or harsh and stiff, instead of soft or fluffy, thus providing considerable advantage in the use of low pressure steam for such purposes. In producing lower pressures and temperatures, the weighted valve is only weighted to such a point that it is controlled to give 10 inches of vacuum on the header or secondary. The lower side of the diaphragm which is connected through a one-half inch pipe to the control line 52 and 52a and by the connection 54 or 54a at the near end of the header or secondary to which connected down stream or toward the far or low pressure end from the reducing valve, is connected at the farthest end of the control pipe 52 or 52a with the corresponding end of the header or secondary, so that steam is supplied to all rolls. Under this control system when the steam flows from the secondary through the pipes 54 or 54a to the pipes 52 or 52a the valves 13 or 13a will open up to obtain a supply of steam as there is not enough pressure on the diaphragm to balance the weight and this flow will continue until the header or secondary becomes or reaches the same pressure at the far end as at the near end when the flow in the pipes 52 or 52a will stop so that the valves 13 or 13a will be balanced at 10 inches of vacuum, and any increase in pressure on the pipe 54 will have a tendency to close the valve to shut off the supply of steam. Also, any drop in pressure at the far end of the pipe 52, as at 52b where it connects with the far end of the secondary will have a tendency to open the valve. Thus, a flow in the line 60 or 60a causes the pressure at the top of the diaphragm to open the valves 42 of the reducing valves 13 or 13a and the more the flow the more the valve will open, and the less the flow the more the valve slows down or closes off the supply of steam. In this way, the problem of furnishing steam for 60 inch rolls with good circulation through the rolls will be accomplished by adjusting the system for 10 inches of vacuum pressure on the inlet of each roll and as this would need a 2 inch vacuum pressure difference between the inlet and the outlet to insure proper circulation through the roll, this would mean 12 inches of vacuum pressure on the return line from the rolls; however, as it is necessary to lift the condensate or water out of the rolls three feet or 36 inches in a 5 foot or 60 inch roll, this would require an additional 6 inches of vacuum or 18 inches of vacuum in all on the return line from the rolls to maintain 2 inches of vacuum pressure difference between the inlet and outlet of each roll to get a rapid circulation in each roll and insure a complete, constant and steady draining or removal of the moisture therefrom and prevent the same from operating only intermittently and usually with a rush. This may be accomplished in any number of rolls or any section of the same set of rolls or any number of sections, but without my invention 10 inches of vacuum in the header or secondary would result in a drop in pressure in each roll until the last roll was reached starting from the reducing valve, so that there would be no circulation. By producing 18 inches of vacuum on the last roll and a 2 inch differential to obtain a flow, a 20 inch vacuum would be required and this with 6 inches of vacuum to lift the water 3 feet would mean from 26 to 29 inches of vacuum on the return line to maintain a flow in each roll. The advantage of my control arrangement is therefore apparent, as it is not practical to produce from 26 to 29 inches of vacuum, while it is practical to produce 18 inches of vacuum. Therefore, the control system, which while being automatic and self-operated, will control the inlet and outlet of each unit or roll at any set difference in pressure, as well as to taper or step the pressures and temperatures downwardly toward the entering end, or upwardly toward the discharge end, as desired. Also, it will be unnecessary to use a single roll of 12 to 14 feet in diameter only for light fabrics or paper and which of course is very expensive to install and maintain, and almost impossible, if not practically impossible, to empty of condensate in view of the fact that the water must be raised from 6 to 8 feet to discharge the same. Also, where such large rolls or drums are only used with light paper or thin fabrics, they are usually prohibitive and shut down a considerable length of time, except when drying thin paper and the like. Thus, in one form the pressure is maintained uniform, such as 50 pounds or minus 10 inches of vacuum with a 2 pound or inch differential to cause a circulation and an additional 6 pounds pressure or inches of vacuum to completely and constantly discharge the condensate or water from the rolls. In the other form the pressure is stepped down successively in each unit or roll. Also, each unit or roll is individually controlled between the inlet and outlet with 2 inches or 2 pounds uniform differential at all times to keep the water or condensate discharged and avoid variations in temperatures and pressures as before, where the water collects and discharges with a rush or gush and then seals the outlet again until such time as the differential builds up and is sufficient to intermittently cause the discharge thereof to the drain or otherwise. This is because I control each unit or roll at the high or outlet side above the bottom of the roll and outside of the roll at the drain, i. e., low pressure side and thereby results not only in greater efficiency but in economy in the use of fuel and steam.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention what I claim as new and desire to secure by Letters Patent is

1. In a heat transfer system having a plurality of heat exchangers having inlets and outlets a primary steam supply line therefore and a secondary steam supply line fed from the primary line and connected to the inlets of the heat exchangers, outlets for the heat exchangers, and a drain therefor, a regulating valve interposed between said primary and secondary lines and controlling the supply of steam from the former to the latter, pressure actuated control means for said regulating valve, said control means adapted to maintain said regulating valve in a closed position upon an increase in pressure in the secondary steam line and at one side of the pressure-actuating means and means to open said valve upon the pressure in the secondary line decreasing below a predetermined pressure, comprising control lines connected to opposite sides of the control means and independently to the high and low sides of said system and secondary steam line respectively.

2. In a heat transfer system, a heat transfer element having supply and exhaust sides a primary steam supply line and a secondary steam line connected to the supply line and to the element, a regulating valve interposed between said primary and secondary lines, pressure actuated control means for said regulating valve connected to the secondary steam line and exhaust sides of the element, said control means adapted to maintain said regulating valve in a predetermined position determined by the average pressure in the secondary steam line and means to open said valve upon the pressure in the secondary line or in the supply or exhaust sides of the element receding below said average pressure.

3. In a heat transfer system having a plurality of heat transfer elements, a primary steam line therefor and a secondary steam line receiving steam from the primary line and connected to said elements, said elements having outlets and a drain for said outlets, regulating valves interposed between said primary and secondary lines for certain of said elements, pressure actuated control means for each of said regulating valves comprising pipes leading from opposite sides of the pressure-actuated means and connected from opposite sides thereof to the secondary lines and exhaust sides of the elements respectively, said control means adapted to maintain said regulating valves normally in a closed position when the pressure in the secondary steam line and elements is at a predetermined point and to open said valves upon the pressure in the secondary line or transfer elements going below said predetermined pressure.

4. In a heat transfer system having heat transfer elements, a primary steam supply line and secondary steam lines connected to the primary supply line, said elements having an exhaust side and a return, a regulating valve interposed between certain of said primary and secondary lines, pressure actuated control means for said regulating valve, said control means adapted to normally maintain said regulating valve closed, and means connected to said control means for opening said valve when the pressure in the secondary steam line goes below a certain point, said means including small control lines connected to opposite sides of the pressure actuated control means, one of said lines being connected to a secondary toward the near end thereof and to a secondary adjacent the far end thereof, and the other line being connected to the exhaust side of the system and heat transfer elements thereof.

5. In a heat transfer system having heat transfer means with feed and discharge ends a primary steam supply line and a secondary steam line connected to the supply line and with the feed ends of the heat transfer means, a regulating valve interposed between said primary and secondary lines, pressure actuated control means for said regulating valve, said control means adapted to maintain said regulating valve closed at a predetermined pressure and to open the same when the pressure in the secondary steam line departs from said predetermined pressure therein, and comprising control lines connected to opposite sides of the pressure control means, one of said control lines being connected to a secondary at the high pressure side and at the remote end of a secondary, and another control line being connected to the outlets of the heat transfer means and to the discharge end thereof.

6. In a heat transfer system having heat transfer means having an inlet and an outlet, a primary steam line and a secondary steam line, a regulating valve interposed between said primary and secondary lines, pressure actuated control means for said regulating valve, said control means adapted to maintain said regulating valve closed at a predetermined pressure and to open the same when the pressure in the secondary steam line recedes below said predetermined pressure therein, and comprising control lines connected to opposite sides of the pressure control means, one of said control lines being connected to a secondary adjacent the near and remote ends of the secondary, and another control line being connected to the outlets of the heat transfer means and to the discharge end thereof and connected directly to the pressure actuated control means at its near end.

7. In a heat transfer system having heat transfer means having inlets and outlets with a discharge end, a primary steam supply line and a secondary steam line receiving steam from the primary supply line, a regulating valve interposed between said primary and secondary lines, pressure actuated control means for said regulating valve, said control means adapted to maintain said regulating valve closed at a predetermined pressure and to open the same when the pressure in the secondary steam line departs from said predetermined pressure therein, and comprising control lines connected to opposite sides of the pressure control means, one of said control lines being connected to a secondary at the high pressure side and at the remote end of a secondary, and another control line being connected to the outlets of the heat transfer means and to the discharge end thereof with an interposed thermostatic trap valve, and indirectly connected at its far end to the pressure actuated control means.

8. In a heat transfer system having heat transfer means, a primary steam supply line and a plurality of secondary steam lines connected to the supply line, said heat transfer means having a drain, a regulating valve interposed between said primary and secondary lines, pressure actuated control means for said regulating valve, said control means adapted to maintain said regulating valve closed at a predetermined pressure and to open the same when the pressure in the secondary steam line lowers below said predetermined pressure therein, and comprising control lines connected to opposite sides of the pressure control means, one of said control lines being connected to a secondary at the high pressure side and at the remote end of a secondary and another control line being connected to the outlets of the heat transfer means and to the discharge end thereof, and indirectly connected at its far end to the pressure actuated control means independently of the other control line and connections and a return pipe connected to the drain and said control lines at the remote ends thereof.

9. In a heat transfer system, heat transfer elements a primary steam supply line and a secondary steam line connected to the supply line, a regulating valve interposed between said primary and secondary lines, pressure actuated control means for said regulating valve, said control means adapted to maintain said regulating valve closed at a predetermined pressure and to open the same when the pressure decreases below said predetermined pressure to maintain an average pressure in the secondary steam line, said control means including control lines connected to opposite sides of the pressure actuated control means, at least one of said lines being connected to the high pressure side of a secondary line at the near end of the system and at its opposite end to the remote end of a secondary and the other control line being connected at its far end to the discharge side of the system and at points to the low pressure sides of the heat transfer elements in the system.

10. In a heat transfer system having a plurality of heat transfer units, a primary steam supply line, a secondary steam line receiving steam from the primary line and connected to the units, a regulating valve interposed between said primary and secondary lines to control the supply of steam from the former to the latter and having a pressure actuated balanced control means adapted to maintain said valve in a predetermined position, and control pipes of reduced size connected to opposite sides of the pressure actuated control means, certain of the pipes being connected to a secondary at the near end of the system and to the remote end of a secondary line, and the other control pipe being connected to the outlets of the heat transfer units of the system and to the exhaust end thereof.

11. In a heat transfer system having a plurality of heat transfer units, a primary steam supply line, a secondary steam line connected to the supply line and the units, a regulating valve interposed between said primary and secondary lines and having a pressure actuated balanced control means adapted to maintain said valve in a predetermined position, and control pipes of reduced size connected to opposite sides of the pressure control means, certain of the pipes being connected to a secondary at the near end of the system and to the remote end of a secondary line, and the other control pipe being connected to the outlets of the heat transfer units of the system and to the exhaust end thereof, the second control pipe being connected directly to the pressure control means.

12. In a heat transfer system having a plurality of heat transfer units having inlets and outlets, a primary steam supply line, a secondary steam line connected to the supply line and to the inlets, a regulating valve interposed between said primary and secondary lines and having a pressure actuated balanced control means adapted to maintain said valve in a predetermined position, and control pipes of reduced size connected to opposite sides of the pressure control means, certain of the pipes being connected to a secondary at the near end of the system and to the remote end of a secondary line, and the other control pipe at its far end being connected to the outlets of the heat transfer elements of the system and to the exhaust end thereof, said second control pipe terminating at the high pressure end of the system and feed end of the first unit and being connected at its remote end to the discharge end of the outlets and at said end only to the other side of the pressure control means.

13. In a heat transfer system having heat consuming units with an exhaust and a discharge side, a primary steam supply line, a secondary steam line connected to the supply line and the units, a regulating valve interposed between said primary steam line and said secondary steam line to control the supply of steam from the former to the latter and having a diaphragm actuated valve therefor, said valve being constructed and arranged to close the regulating valve upon an increase in pressure exerted against said diaphragm at one side, and return steam means, in combination with communicating pipes having one pipe connected from near the beginning of said secondary steam line and another pipe connected at a remote point therein, and to the exhaust and discharge side of the system and to opposite sides of said diaphragm for causing the regulating valve to open at intervals to maintain a relatively constant pressure in the secondary steam line.

14. In a heat transfer system, a plurality of heat consuming and transfer units having a drain, a primary steam supply line and a secondary steam line connected to said supply line and units, a regulating valve interposed between said primary and secondary lines and controlling the supply of steam from the former to the latter, adjustable balanced pressure actuated control means for said regulating valve, said control means adapted to normally maintain said valve closed, and control lines communicating with opposite sides of the control means for maintaining said valve in a set position and for opening the valve upon a reduction in pressure in the units, certain of said lines being connected to one side of the control means to a secondary at the near and remote ends thereof and another of said lines being connected to the opposite side of the control means and connected to the outlets of the heat consuming and transfer units and to the drain therefrom.

15. In a heat transfer system, a plurality of heat consuming and transfer units, a primary steam supply line and a secondary steam line connected to said primary supply line and units, a regulating valve interposed between said primary and secondary lines, adjustable balanced pressure actuated control means for said regulating valve, said control means adapted to maintain said valve closed, and control lines communicating with opposite sides of the control means for maintaining said valve in a set position, certain of said lines being directly connected to a secondary near remote ends and another of said lines being connected to the opposite side of the control means and connected to the outlets of the heat consuming and transfer units and to the drain therefrom.

16. In a heat transfer system, a plurality of heat consuming and transfer units, a primary steam supply line and a secondary steam line connected to said units and receiving steam from the primary steam supply line, a regulating valve interposed between said primary and secondary lines, adjustable balanced pressure actuated control means for said regulating valve, said control means adapted to maintain said valve closed, and control lines communicating with opposite sides of the control means for maintaining said valve in a set position, certain of said lines being connected to a secondary near, remote ends and another of said lines being connected to the opposite side of the control means and connected to the outlets of the heat consuming and transfer units and to the drain therefrom, the connection of the second control line to the opposite side of the control means being through a separate line terminating at the near end of the system and connected to its remote end to the second line.

17. In a heat transfer system a plurality of heat transfer units, a primary steam line, one or more secondary steam lines, one of which is connected to the primary steam line and the others of which are connected to the exhausts from units connected to the secondary line leading from the primary steam line, a regulating valve interposed between said primary line and a secondary line, pressure actuated control means for said valve, said valve being constructed and arranged to close the valve upon an increase in pressure exerted at one side of the pressure actuated means thereof, and return steam means, in combination with communicating pipes, one of which is connected to one side of the pressure actuated means and another of which is connected to the other side of the pressure actuated means, one of said pipes being connected from near the beginning of the secondary steam line and at a remote end of a secondary steam line, another pipe having connections with the outlets of the heat consuming units and with the discharge therefrom, and one of the first named pipes connecting with the latter pipe.

18. In a heat transfer system, a plurality of heat transfer units, a primary steam line, one or more secondary steam lines, one of which is connected to the primary steam line and the others of which are connected to the exhaust from units connected to the secondary line leading from the primary steam line, a regulating valve interposed between said primary line and a secondary line, pressure actuated means for said valve, said valve being constructed and arranged to close the valve upon an increase in pressure exerted at one side of the pressure actuated means thereof, and return steam means, in combination with communicating pipes one of which is connected to one side of the pressure actuated means and another of which is connected to the other side of the pressure actuated means, one of said pipes being connected from near the beginning of the secondary steam line and at a remote end of a secondary steam line, another pipe having connection with the outlets of the heat consuming units and with the discharge therefrom, said latter pipe being connected at the low pressure side and far end of the system with the other of the first named pipes whereby to maintain a constant differential in pressures between the various units.

19. In a heat transfer system having a plurality of heat transfer units, a steam supply pipe and a return pipe therefor, the combination of a control valve in said supply pipe and having a pressure chamber, a pressure actuated movable member in said chamber, means connecting said valve and said member adapted to normally close said valve upon an equalization of pressure upon opposite sides of the member, and control pipes connecting the return pipe and heat transfer units to said pressure chamber upon opposite sides of the member therein to open the valve upon a change in pressure upon opposite sides of the member by a change in pressure in the control pipes below a predetermined point of differential for which the valve is set, one of said pipes last mentioned being also connected to the steam supply pipe at the discharge side of the valve and at a point remote therefrom as to one control pipe and the other control pipe connected to the opposite side of the pressure chamber being connected to the low sides of the heat transfer units at the discharge ends thereof and also connected to the drain from said discharge at a near or remote point.

20. In a heat transfer system having a plurality of heat transfer units successively connected to each other, a steam supply pipe for said units, and a return pipe therefor, a control valve in said supply pipe and having pressure-actuated means having a movable member with opposed chambers closed off from the atmosphere for admitting steam to the units and means controlled by the pressure in the units and comprising control pipes connected to the outlets thereof at near and remote points and to the drain end of the system and extending to opposite chambers of the pressure-actuated means to actuate the control valve thereof and admit steam to the units upon reduction or equalization of the pressure in the units below a predetermined point or establishment of a predetermined differential therein for which the valve is set, said units being connected in series, whereby to give a gradual temperature variation from one unit to the other.

21. In a heat transfer system, a plurality of heat transfer units each having an inlet and a drain, a primary steam supply therefor, secondary steam lines connected to the primary supply line, a regulating valve responsive to the pressures in the units and drain interposed between said primary and secondary lines and controlling the supply of steam from the former to the latter, connections between the secondaries and each unit, a similar regulating valve in each connection and independently controlling the supply of steam from the respective secondaries to the respective units, pressure-actuated control means for each regulating valve, each control means having a chamber with a movable member connected to the corresponding valve and adapted to normally maintain said valves closed, and to open the same when the pressure on one side of the movable member is reduced.

22. In a heat transfer system, a plurality of heat transfer units each having an inlet and a drain, a primary steam supply therefor, a secondary steam line connected to the primary supply line, a regulating valve interposed between said primary and secondary lines and controlling the supply of steam from the former to the latter, connections between the secondary and the elements of the first unit, a flash tank for certain units, a return discharge from each of the latter units leading to the drain, and a connection from each flash tank to the succeeding unit, a similar regulating valve in certain of the latter connections, and pressure-actuated control means for each valve comprising control lines connected to opposite sides of the control means, one control line being connected to one side of the control means and to each connection to a unit at the near and far ends thereof and to the outlets of the unit and drain at its far end, and another control line connected to the other side of the control means and to the drain, said control means being so controlled as to give a gradual temperature variation from one section to the other.

23. In a heat transfer system having a plurality of heat transfer units, a steam supply pipe for said units, and a return pipe therefor, a control valve in said supply pipe and having pressure-actuated means having a movable member with opposed chambers closed off from the atmosphere for admitting steam to the units and means controlled by the pressure in the units and comprising control pipes connected to the outlets thereof at near and remote points and to the drain end of the system and extending to opposite chambers of the pressure-actuated means to actuate the control valve thereof and admit steam to the units upon reduction or equalization of the pressure in the units below a predetermined point or establishment of a predetermined differential therein for which the valve is set.

SAMUEL P. MILLER.